United States Patent [19]

Boschi

[11] 4,388,096
[45] Jun. 14, 1983

[54] APPARATUS AND PROCESS FOR THE ALIGNMENT OF MECHANISMS AND/OR ARMS FOR THE MOLDS CHANGES IN MACHINES FOR THE MANUFACTURE OF GLASSWARE, THERMOPLASTIC ARTICLES OR SIMILARS

[75] Inventor: Alide B. Boschi, Monterrey, Mexico

[73] Assignee: Vitro Tec Fideicomiso, Monterrey, Mexico

[21] Appl. No.: 330,884

[22] Filed: Dec. 15, 1981

[51] Int. Cl.³ ............................................. C03B 9/197
[52] U.S. Cl. ........................................ 65/29; 65/158; 65/171; 65/172
[58] Field of Search ................... 65/171, 172, 158, 29

[56] References Cited

U.S. PATENT DOCUMENTS 2,557,322 6/1951 Storrs ................................... 65/171
3,005,289 10/1961 Lauck .................................. 65/172

*Primary Examiner*—Arthur D. Kellogg
*Attorney, Agent, or Firm*—Kemon & Estrabrook

[57] ABSTRACT

A mold gauging device and a method for gauging a mold is disclosed wherien a false mold having vertically adjustable gauges therein is positioned between a mold hinge in substitution for a mold to be set therein and with other alignment means placed on the false mold measurements are made of the mold to be set therein to its other cooperating mechanisms, which mechanisms are then adjusted to their proper positions.

2 Claims, 8 Drawing Figures

APPARATUS AND PROCESS FOR THE ALIGNMENT OF MECHANISMS AND/OR ARMS FOR THE MOLDS CHANGES IN MACHINES FOR THE MANUFACTURE OF GLASSWARE, THERMOPLASTIC ARTICLES OR SIMILARS

BACKGROUND OF THE INVENTION

In the conventional system for the manufacture of glassware, thermoplastic or similar article production, such as bottles, flasks, etc, the melted glass is fed in the form of gobs which are distributed by means of a distributor, to the individual forming sections (generally eight) constituting the machine (known as I.S. machine) in which the glass can be given the desired container shape.

Such glassware production, is herewith made through one conventional process called "blow and blow" in the parison and blow molds of the respective sections of the I.S. machine. In these machines it is necessary first to form a parison in the parison or blank mold and this is done in an inverted position. The neck ring of the container is finally formed here and afterwards the parison is inverted to its normal position and placed in a blow mold where the parison is blown to finished form.

Formation of the preform is carried out conventionally in the "blow and blow" process, by a molten glass gob fed into the parison mold through a funnel positioned over the mold in order to guide the gob into the mold. Thereafter a baffle is positioned over the funnel, to provide a settle blowing that settles the gob in the bottom of the parison mold filling the neck ring mold, accurately forming the container neck ring or crown and allowing even contact of the glass with the walls of the parison mold. After the baffle and the funnel are disengaged and withdrawn; the baffle alone is positioned over the parison mold, in order to act in this case as a baffle having the shape of the preform bottom. Then a counterblowing forms the parison and prepares it for inversion and an inversion mechanism carries the preform to the blow mold wherein a final blow is provided in order to give the container its final form.

Finally a take off mechanism grips the article by its neck ring or crown, the blow mold is opened, and the take off mechanism is moved to place the article, still hot, over a dead plate when it is pushed by a 90° push out mechanism, to place it in a conveyor which carries the containers of all the sections, to a lehr for a thermal treatment to eliminate the stresses accumulated in the glass during the manufacturing process.

As it is obvious, the precise synchronized movements and placements of each one of the mechanisms constituting the sections of the machine is critical and each one of those machines must be placed and moved with accuracy and at the right height, in such a way that collisions among the mentioned mechanisms are avoided.

The level of the mechanisms and/or arms depends on the size of the container being manufactured and such levels depend in turn, on the physical measurements of the parts which constitute the parison mold and the blow mold (called afterwards only molds).

When it is necessary to produce containers of a certain shape or model and afterwards to produce another type of containers, it is necessary to stop the forming machine in order to change the molds of each section of the machine wherein the height and center of the mechanisms and/or arms of each section have to be adjusted according the respective molds, i.e. the funnel, baffle, neck ring, bottom plate, fingers mechanisms, etc. (called also variable equipment of the machine).

Traditionally the alignment of the delivery equipment of the machine, can be made by hand, at the environment temperature, for each one of the mold changes, adjusting the machine mechanisms with the parts of the mold sets that are going to be used, making each change directly in each respective section and with the help of shims, that determine the distance to which the mechanisms of each section must be leveled. This has the disadvantage that in heating the mold sets in each section of the machine when making them functional, molds expand, making the mechanisms bind causing damage and loss of containers, so that the section has to be stopped in order to realign the machine at operating temperature after the change is started.

Another disadvantage that has been found in changing of the respective mold sets is that the manual adjustment for each section does not always ensure leveling which is the same for each section.

An additional disadvantage in conventional manual mold changes is that the alignment is usually effected with shims, which is only approximate and results in excessive pounding of the molds requiring excessive mold maintenance.

All these above mentioned disadvantages are overcome through the apparatus and process of the present invention for the alignment of mechanisms and/or arms in changing mold sets because they will permit an exact alignment in the height and the centering of the delivery equipment of the I.S. machine.

BRIEF SUMMARY OF THE INVENTION

Having in consideration the problems of the prior art alignment, it is a main object of the present invention to provide an apparatus and process for the alignment of mechanisms and/or arms in changes of mold sets for machines for forming glassware, thermoplastics or the like, which provides absolute identity in the different sections of the machines.

Another object of the invention, is to provide an apparatus and process which avoid the realignment of the variable equipment after changing molds.

One more object of the present invention, is to provide an apparatus and process having the possibility of reproduction of the alignment in future changes, because the aligners arrangement is made in a mold shop according to the thermal conditions of production and mold set design.

It is another object of the present invention, to provide an apparatus and process which will allow preheating of the mold sets in an electric oven, to assure that when starting the section, the mold sets are in optimum condition to produce containers with minimum losses.

Another object of the present invention is to provide an apparatus and process which will permit identification of faulty pieces of the delivery equipment that do not permit correct alignment.

These and other objects and additional advantages of this invention will be clear to those persons having ordinary skill in the art, from the following detailed description of the invention.

DETAILED DESCRIPTION

Figure 1:
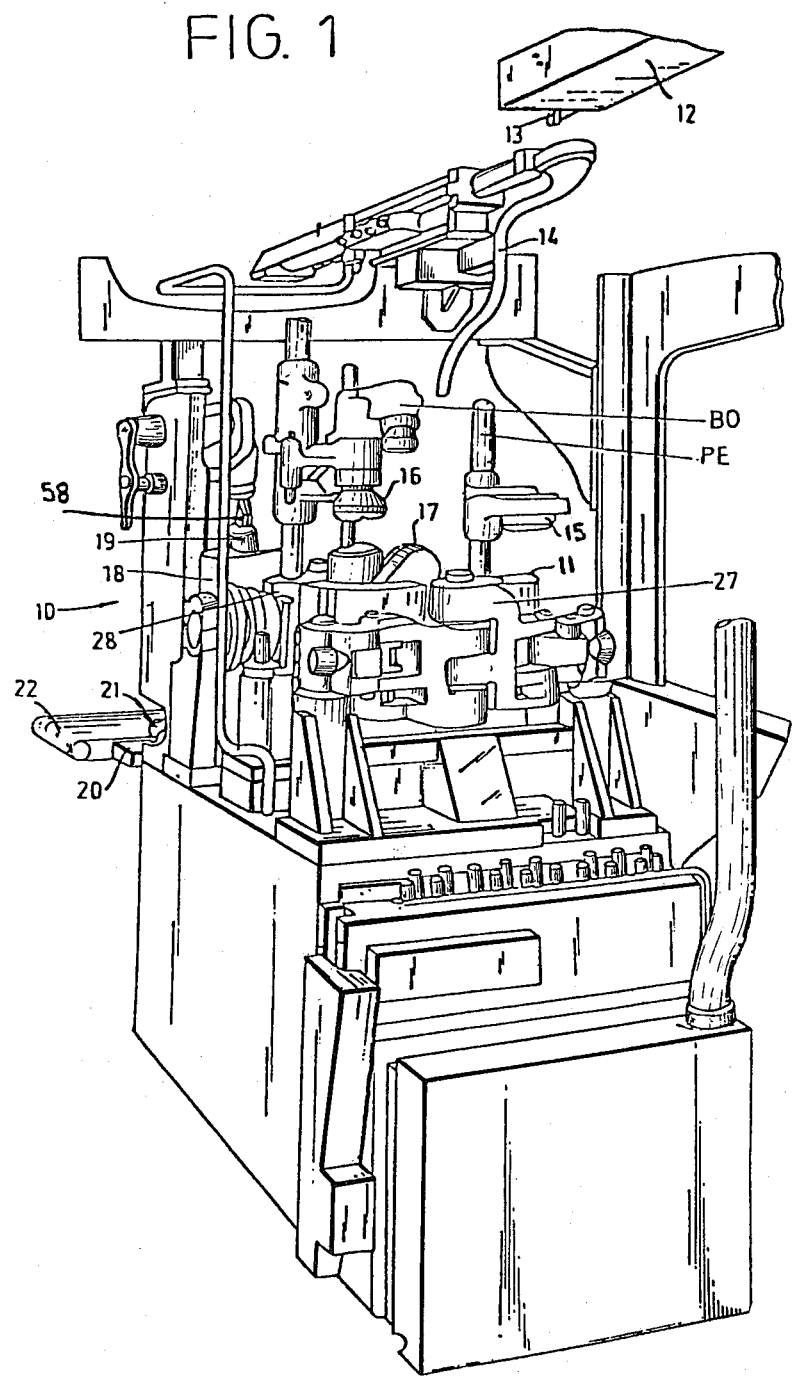
FIG. 1 is a perspective view of one of the sections of the glassware forming machine.

Referring to FIG. 1, one of the sections 10 of a glassware forming machine is shown from the back part corresponding to the side of the parison mold 11. This section comprises, a feeder 12 that feeds a continuous flow of melted glass, which is cut by a shear cutter mechanism 13, in portions called gobs, which are distributed by means of a gob distributor 14, toward the individual forming sections (generally eight) constituting the machine, which shapes the gobs to the desired container shapes.

Each section of the machine includes; a funnel mechanism 15 and a baffle mechanism 16, associated with a parison mold 11. An inversion mechanism 17 placed in the middle part of the machine section, transfers the parison formed in parison mold 11 to a blow mold 18, located at the front of the machine section. A take out mechanism 19, having fingers 58 is positioned close to the blow mold 18, in order to deposit the article or container formed in the blow mold 18, over a dead plate 20 (one for each section of the machine), in position to be transferred by a 90° push out mechanism 21, located in front of the machine, which deposits the formed article on a conveyor 22 which in combination with other transportation means (not shown) carry the articles of all the sections to a lehr for relief of thermal stresses.

As will be understood, the container manufacturing process is of the "blow and blow" type, as will be described in combination with FIGS. 1 and 2.

Figure 2:
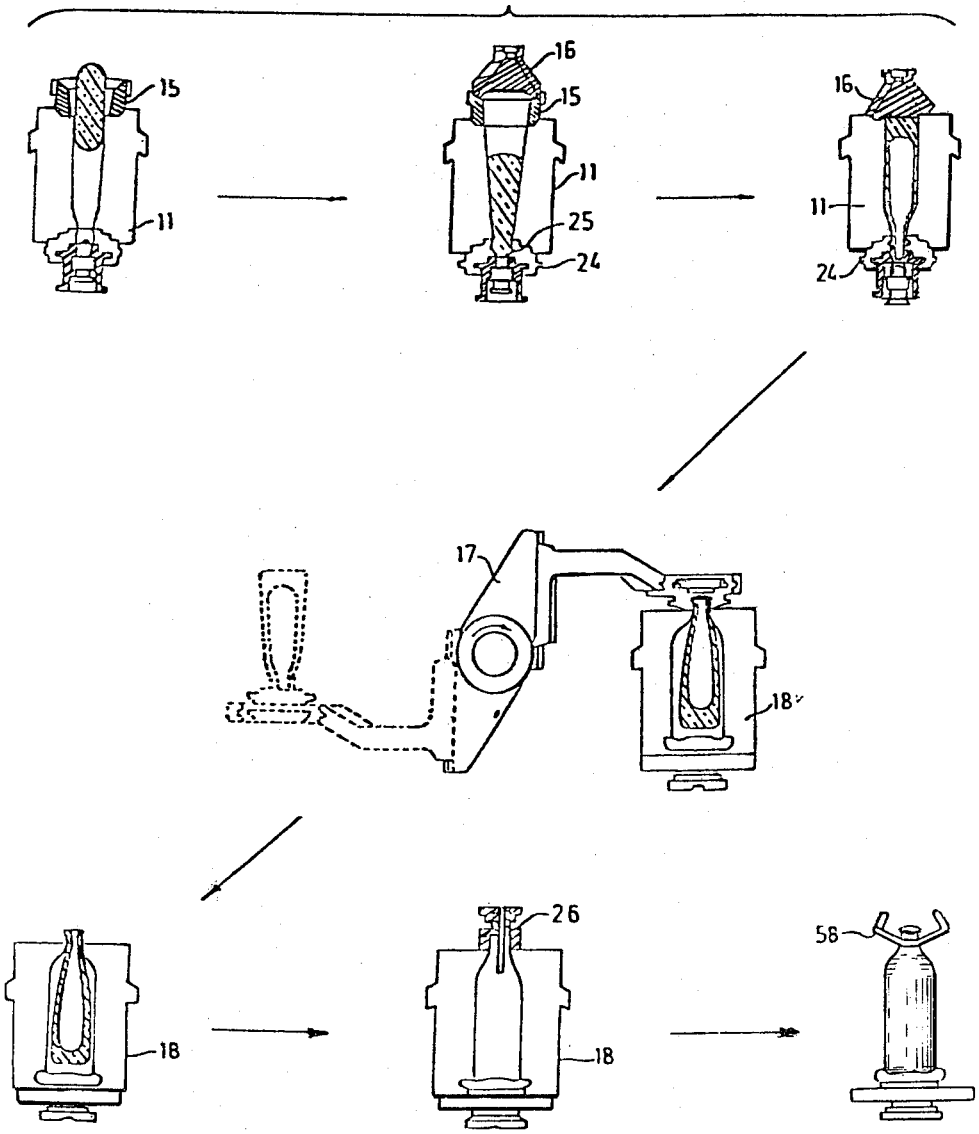
FIG. 2 is an illustration of the operation sequence of the glassware forming machine.

As indicated in the first stage of the illustrated sequence in FIG. 2 each machine receives a gob, directed to the parison mold 11. A funnel 15 is first coupled on top of the mold, in order to guide the gob into the mold. In the second stage, a baffle 16 is coupled over the funnel 15, and a settle blow is provided that settles the gob in the bottom of the parison mold 11. In order to fill the neck ring mold 24 around the plunger 25 to correctly form the container neck ring or crown and allow even contact of the glass with the side walls of the parison mold. After the settle blow, the baffle 16 is disengaged and moved off and then the funnel 15 is disengaged and moved off. In the third stage, the baffle 16 is again coupled over the parison mold to provide a surface having the desired shape of the bottom of the parison. A counter blow is introduced by retracting the plunger 25, in order to complete formation of the parison and make it ready for inversion.

During this counter blow stage, the parison mold extracts heat from the parison, in order to cool the parison walls to make the parison rigid enough to allow its handling by the inversion mechanism 17, which transfers it to the blow mold 18, to the front side of the machine, seen with more clarity, in the fourth stage.

Once the article is transferred to the blow mold, and placed in a vertical position, the neck ring mechanism 24 is opened leaving the preform in the blow mold (fifth stage) wherein it is reheated to make the glass soft enough for the final blow.

The final blow, indicated in the sixth stage of FIG. 2, shows a blow head 26, positioned in the upper part of the blow mold. This supplies a final blow, which results in the final form of the article. In the last shown stage, the blow mold is opened, and the fingers 58 of the take off mechanism 19, take the article by its neck ring to transfer it to the dead plate 20, to be pushed by a 90° push out mechanism 21, to place it in the conveyor 22 and afterwards in combination with other means of transportation, to guide all the articles from all the sections of the machine to a lehr for relief of thermal stresses.

Figure 3:
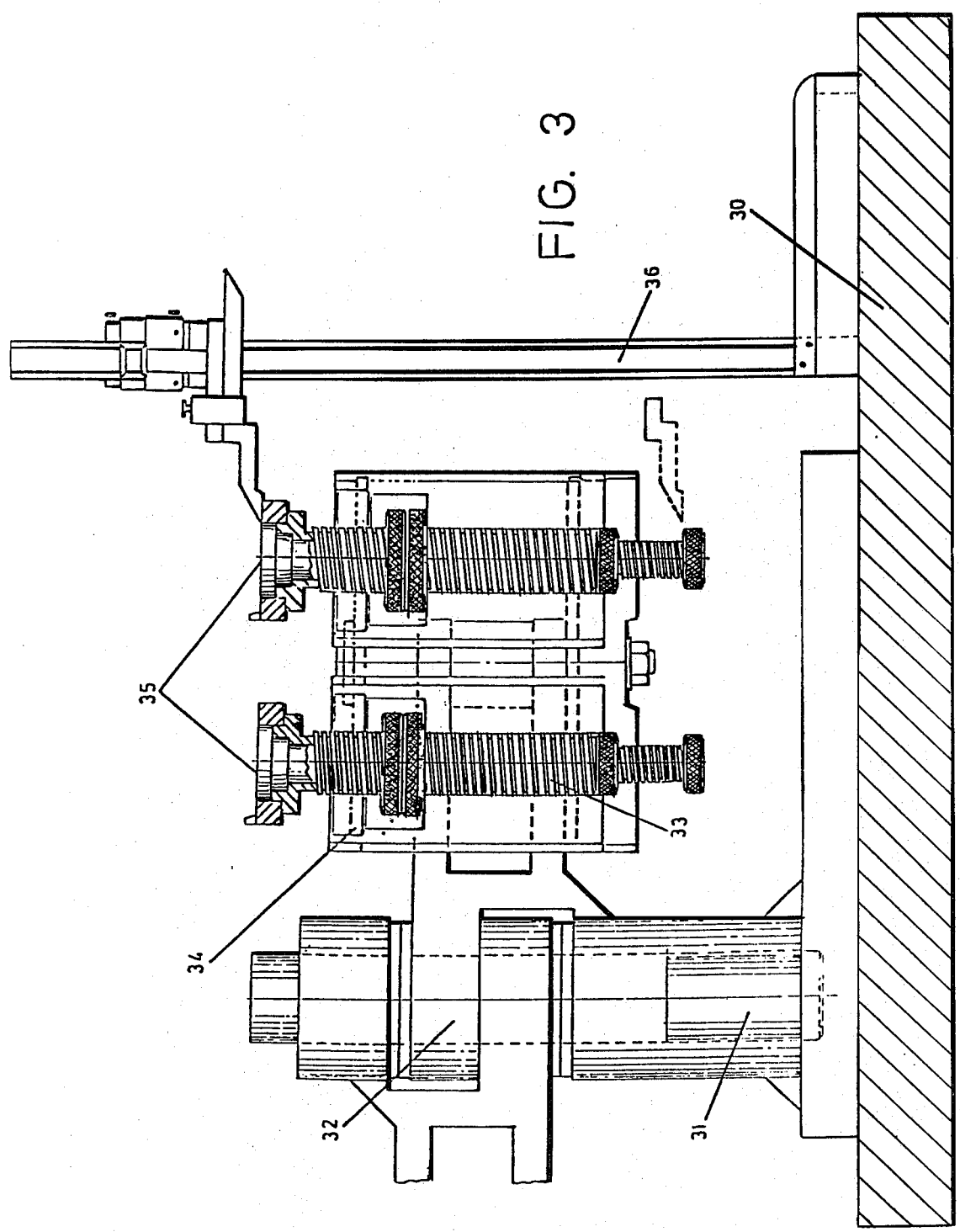
FIG. 3 is a lateral view of the apparatus of the present invention.
Figure 4:
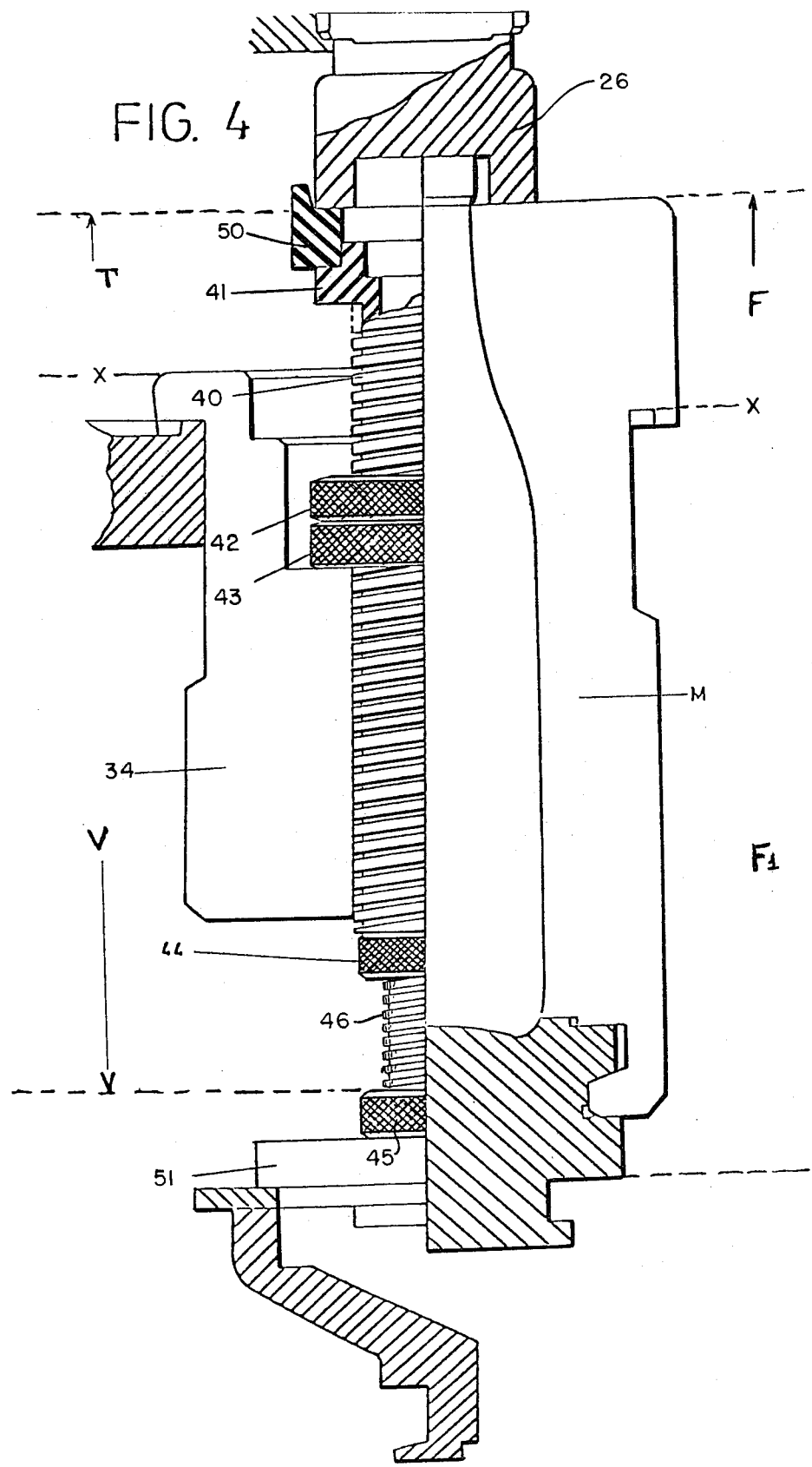
FIG. 4 is a cross sectional view of the apparatus of the present invention, showing an arrangement for setting the blow head and bottom plate mechanism.
Figure 5:
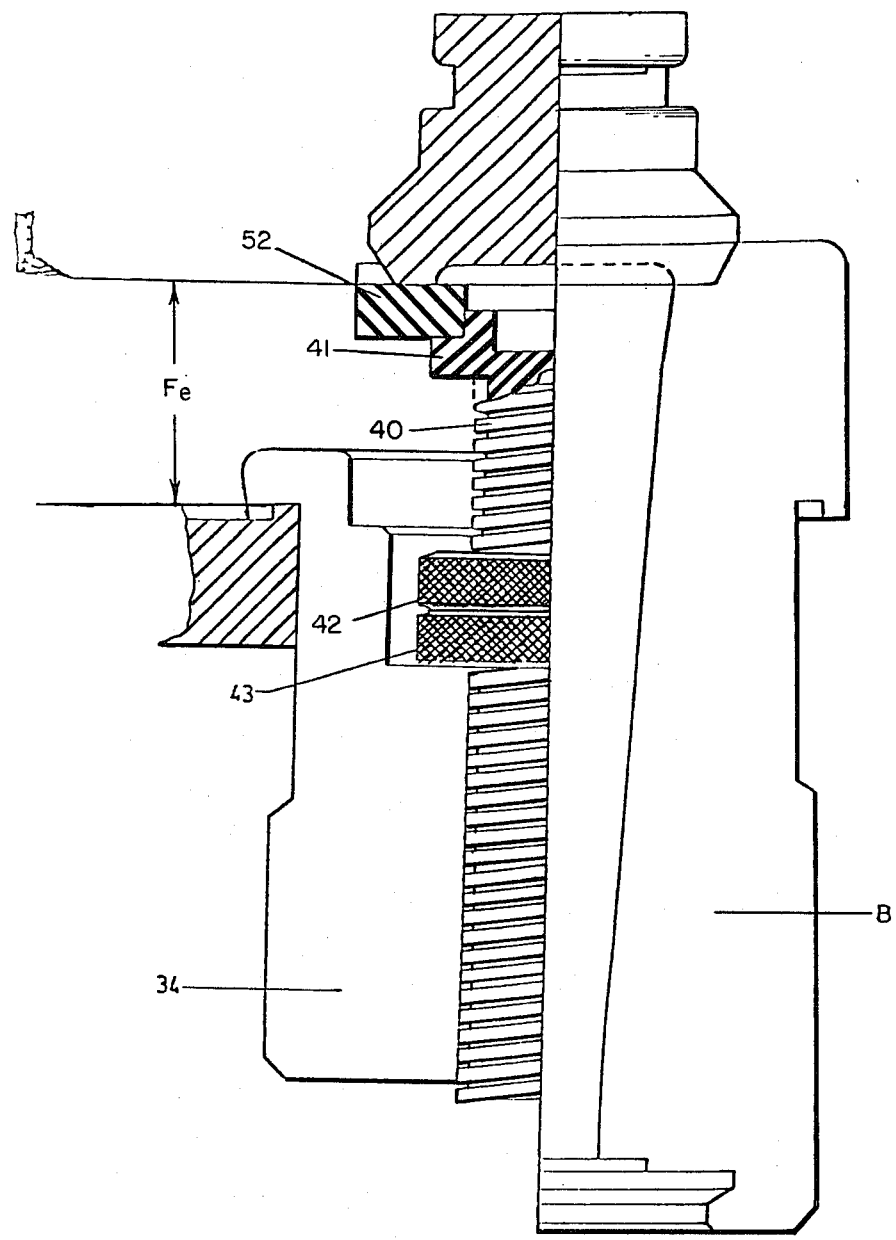
FIG. 5 is a view similar to FIG. 4, showing an arrangement for setting the baffle mechanism.

Making particular reference to FIGS. 3 and 4, they show the alignment apparatus of the present invention, which will greatly reduce the time for changing molds, in glassware forming machines of this type.

This apparatus includes a support base 30 having a hinge support post 31 mounted at one end thereof. A hinge 32 is pivoted horizontally to the middle part of the post 31. A false mold 34, is vertically supported on the other end of the hinge 32, from which the measurements of the variable mechanisms of the machine are made depending on the new mold. An adjustable gage 33 is supported within the cavity of the false mold in order to carry out both ascending and descending measurements according to the real length of the actual molds. The gage comprises a stud 40 exteriorly and interiorly threaded and having on its upper part a support 41, adaptable to various mechanisms of the machine. A circular nut 42 and a counter lock nut are threaded on the stud, in order to displace and fix the vertical position of the stud 40 depending on the actual dimensions of the mold sets an exteriorly threaded stud 46 is disposed interiorly of the stud 40 and carries its respective nut 44 and counter lock nut 45 permitting adjustment of the position of the mold sets to be aligned. Interchangeable variable aligners 35 (funnel aligner, baffle aligner, neck ring aligner, blow and bottom plate aligners, finger mechanism aligner) that are placed over the upper and/or lower part of aligner 32, are adaptable and interchangeable according to the dimensions of the mold set and the mechanisms of the machine. A marking gage 36 is placed vertically in the support base 30, and positioned in the rear end of the hinge support 31, in order to measure the displacement of the aligner 33 and interchangeable variable aligners 35 throughout the false mold 34, corresponding to the actual dimensions of the mold sets to be aligned.

The process which will be used with apparatus of the present invention (previously arranged in a mold set workshop) and that will allow the alignment of the delivery equipment of the forming machines (funnel mechanism, baffle mechanism, neck ring mechanism, blow and bottom plate mechanism, finger mechanism) substantially diminishes the time for mold changes (mold and parison mold). Basically the process includes providing a projecting reference point simulating the mold relationship from which the alignment of the mechanisms and/or arms of the machine involved, will be made. Making a first setting starting from said reference point and with a suitable adjustable gage fixed at the reference point and with the measurements of the real mold. Making a second alignment through interchangeable gages suited to the height and center of the different mechanisms and/or arms of the machine. Making a measurement of the location of each one of the mechanisms and/or arms of the machine which are involved in the alignment and placing the reference point with its gages and measurements, on the supports of the machines and adjust the mechanisms and/or machine arms, according to the measurements and to the real functioning of each one of them, obtained during the alignment.

Figure 6:
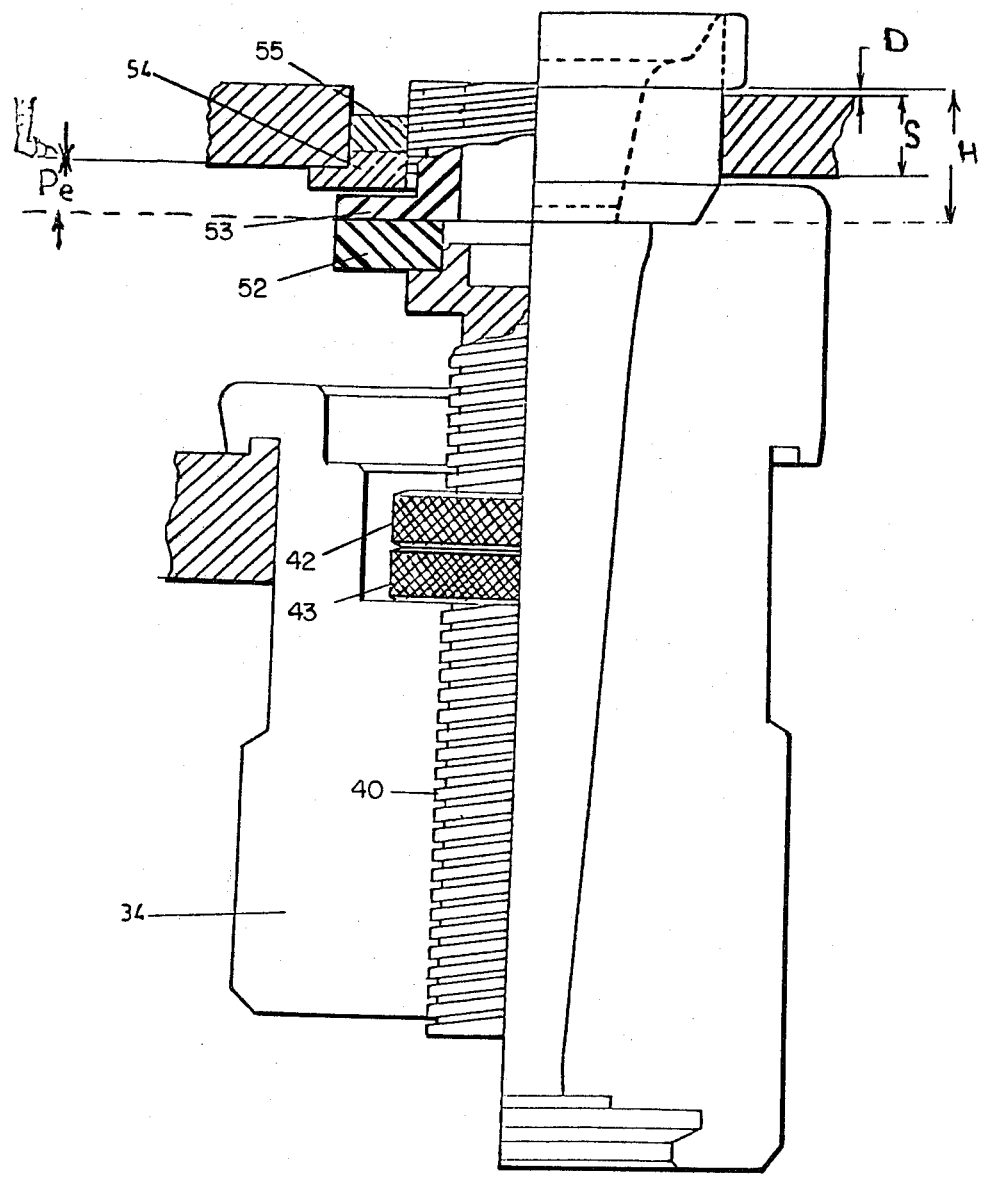
FIG. 6 is a view similar to FIG. 4, showing an arrangement for setting the funnel mechanism.

This procedure is better understood with reference to FIGS. 3 to 8. (1) Place the false mold 34, vertically in the hinge 32, allowing this to support in its internal part the gage 33. (2) Adjust the parts of the gage 33 according to the real measurements F and F1 of the mold set M (mold side) as shown in FIG. 4. (3) Place in the upper part of the aligner 33, a blow head aligner 50, to provide the "T" measure in order to align the blow head arm. (4) In the lower part of the aligner 33, add a bottom plate aligner 51, in combination with the support base 30, in order to get the measurement V in order to align the bottom plate. (5) Again on top of the upper part of the gage 33 (FIG. 5.) remove the blow head aligner 50 and replace by a baffle aligner 52, which allows the measurements of the parison mold aligners B by getting the Fe measurement to align the baffle arm. (6) Then it is necessary to adjust on the baffle gage 52, a funnel holder gage 53 with an outside thread as shown in FIG. 6. The gages include a funnel holder aligner nut 54 and a funnel holder aligner counter lock nut 55; which will be set according to the measurements H, S and set D, measurement Pe being obtained to set the funnel holder arm.

Afterwards, with the measurements already obtained, the settings on the mold side of the machine are made by locating the false mold 34, in the hinge 27 of the machine and closing the mentioned hinge. Then the gage 33 is placed into the false mold 34, in the same way as shown in FIG. 4, making sure that the gage 33 has a perfect seat in the false mold. Next place the blow head gage 50, in its position on that of the gage 33. (7) To set the blow head arm (not shown) mount the blow heads 26 on the arm; loosen the arm and lower it until the heads 26 rest uniformly on the blow head gage 50, operate the mechanism to lower the arm to the end of its travel stroke and tighten the arm in this position.

The bottom plate holder (not shown) is set by placing the bottom plate holder setting piece 51 in the bottom holder mechanism and raising said mechanism until the upper surface of the bottom holder setting piece 51 makes perfect contact with the lower surface of the gage 33.

Figure 7:
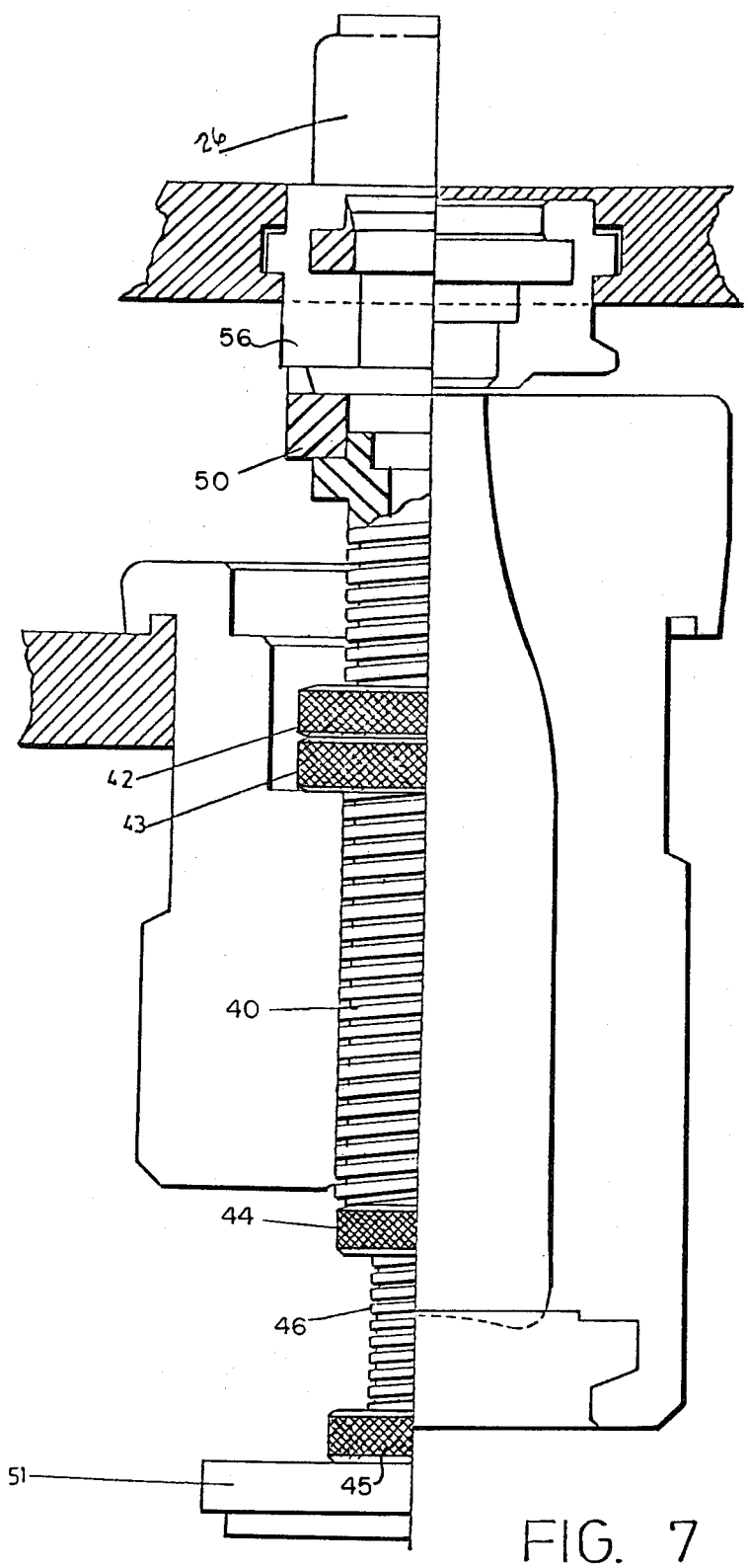
FIG. 7 is a view similar to FIG. 4, showing an arrangement for setting the neck ring mechanism.

On the upper part of gage 33, with the same setting adjustment of the blow head arm, or by using again the blow head setting piece 50, there is positioned on the gage 50, a neck ring gage 56, in the form shown in FIG. 7. The alignment of the neck ring holder mechanism is accomplished as follows: (1) Place the neck ring gage 56 in the neck ring holder mechanism (not shown). (2) Actuate the inversion mechanism and while maintaining it in this position, loosen the neck ring holder arms to lower them until the neck ring gage 56, settles on the upper part of the blow head gage. (3) Actuate the blow head mechanism 26 in order to keep the blow head gage 50 in that position. (4) Raise the arms of the neck ring holder mechanism until it strikes the neck ring gage 56 and then tighten the arms in this position.

Figure 8:
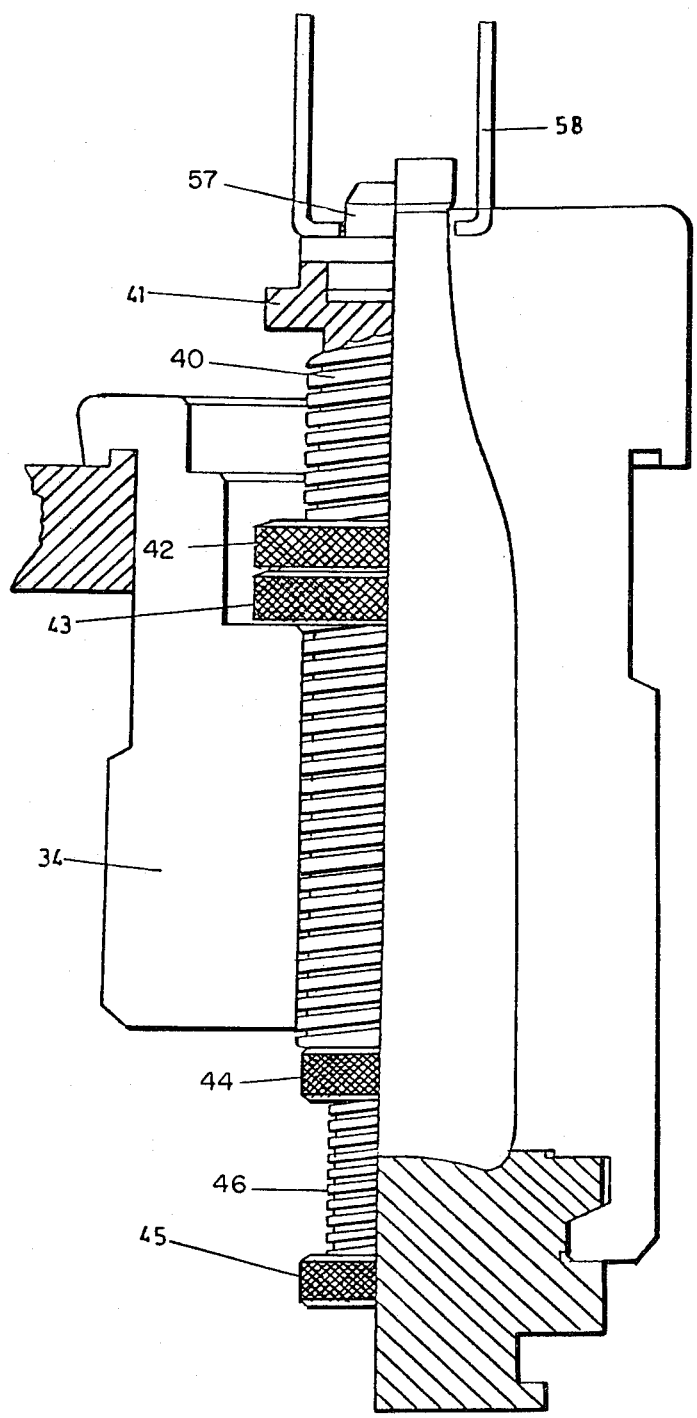
FIG. 8 is a view similar to FIG. 4, showing an arrangement for setting the finger mechanism.

The following step is to set the finger mechanism 19, using the same former arrangement, only taking off the neck ring gage 56 and the blow head gage 50 and placing a finger gage 57, (special for each article) FIG. 8. Then set the fingers mechanism 19 in the following way: (1) Mount the fingers 58 in the fingers mechanism 19. (2) Actuate the take off mechanism and lowering it, taking care to look for the correct center of the fingers 58 in the fingers gage 57 with the proper adjustment of the centering of the arm, so that the fingers 58 do not push them radially in any way, until the fingers 58 touch the upper plane surface of the finger gage 57 and then tighten the mechanism in this position.

Then all the pieces are removed from the mold side, parison mold side B, then being placed as follows: (1) Place the false mold 34 on hinge 28 in the same way shown in FIG. 5 and close the hinge. (2) Place the set of pieces forming the gage 33, into the false mold 34, making sure that the gage 33 settles perfectly in the false mold. (3) Place the baffle model gage over the gage 33 and proceeding to align the baffle arm BO, mounting first the baffle 16 in the baffle arm B). (4) Loosen the arm BO and lower it until the baffle 16 sits uniformly on the baffle gage 52 in its entire periphery. (5) Actuate the baffle mechanism to lower it to the end of its travel and tighten the arm in this position.

Having already set the baffle arm alignment BO the funnel holder gage 53 is placed with the adjustment of its respective funnel holder setting nut 54 and counter lock nut 55, in the same way shown in FIG. 6. It is positioned over the baffle 52, in order to carry out the setting of the funnel holder arm PE in the following way: (1) The funnel holder arm PE is loosened and lowered to sit on the surface of the nut funnel holder gage nut 54. (2) Actuate the mechanism at the end of its stroke and tighten the arm PE. Afterwards, all pieces are withdrawn and the original mold sets which have been previously heated in an electric oven are placed in the hinges of the respective sections of the forming machine. This allows an instantaneous starting of the machine section and having the particular advantage that the leveling of the mechanisms is equal for all sections of the machines.

Even though the present invention has been described for glass container production by the blow and blow process, and with reference to the usual equipment to carry out said process, it is also usable for other processes such as press and blow, and with corresponding equipment giving the same results of the alignment adjustments for changes of mold sets and as a consequence an exact alignment of height and centering of the delivery equipment of the I.S. machine.

Therefore it must be understood that the invention is not limited to the disclosed embodiment and it will be apparent to persons having ordinary skill in the art, that it can be implemented in other different arrangements of the apparatus and procedure, as well as alternative ways to carry out the same, that will remain clearly in the true spirit and scope of the invention set forth in the following claims.

I claim:

1. Apparatus for setting of mechanisms and/or arms in changing molds of machines for forming articles of glass thermoplastic or the like, which comprises:
   support base;
   a vertical support resting on said support base;
   a fastener attached by one end to said vertical support and extending horizontally therefrom;
   a false mold supported adjacent said vertical support by the free end of said fastener, from which measurements are made of the levels and centers of the mechanisms and/or arms of the machine, depending on the dimensions of the new mold;
   adjustable setting means supported internally of said false mold to permit measurements of the vertical portions of either of its ends to simulate the real length of the molds;
   variable replaceable gage members for positioning on the upper and lower ends of said adjustable setting means and which are adaptable to the various mechanisms of the machine which cooperate with the molds; and
   measuring means to measure the movement of the adjustable setting means and variable replaceable setting means, along the reference support, to correspond with the real measurements of the molds to be used.

2. Process for setting of mechanisms and/or arms when changing molds of machines for forming articles of glass, thermoplastic or the like which comprises, in combination, the steps of:
   providing a projecting reference point simulating the mold, from which the setting of the mechanisms and/or arms of the machine is effected;
   making a first setting from said reference point by a suitable gage, positioning at said reference point, with measurements of the real mold;
   making a second setting with replaceable variable gages, adapted to the height and center of the various mechanisms and/or arms of the machine;
   measuring the location of each one of the mechanisms and/or arms of the machine that participate in the setting; placing the reference point with its setting devices and its measurements on the supports of the machine and adjusting the mechanisms and/or arms of the machine to correspond with the measurements made and the real functioning of each of them, obtained during the setting.

* * * * *